(12) United States Patent
Tesvich

(10) Patent No.: US 12,277,610 B2
(45) Date of Patent: Apr. 15, 2025

(54) SYSTEM AND METHOD FOR GENERATING DYNAMIC HOTSPOT MAP FROM SOCIAL MEDIA INFORMATION AND INTERACTING WITH SAME

(71) Applicant: Idea Company LLC, St. Petersburg, FL (US)

(72) Inventor: Preston Tesvich, St. Petersburg, FL (US)

(73) Assignee: Idea Company LLC, St. Petersburg, FL (US)

( * ) Notice: Subject to any disclaimer, the term of this patent is extended or adjusted under 35 U.S.C. 154(b) by 361 days.

(21) Appl. No.: 18/059,510

(22) Filed: Nov. 29, 2022

(65) Prior Publication Data
US 2023/0169610 A1   Jun. 1, 2023

Related U.S. Application Data

(60) Provisional application No. 63/264,614, filed on Nov. 29, 2021.

(51) Int. Cl.
*G06Q 50/00* (2024.01)
*G06F 16/901* (2019.01)
*G06F 18/23213* (2023.01)

(52) U.S. Cl.
CPC ......... *G06Q 50/01* (2013.01); *G06F 16/9024* (2019.01); *G06F 18/23213* (2023.01)

(58) Field of Classification Search
CPC ............... G06Q 50/01; G06F 16/9024; G06F 18/23213
See application file for complete search history.

(56) References Cited

U.S. PATENT DOCUMENTS

| | | | |
|---|---|---|---|
| 2015/0046841 A1* | 2/2015 | Sharon | G06F 15/17306 715/753 |
| 2018/0121567 A1* | 5/2018 | Foust | G06F 16/29 |
| 2018/0129723 A1* | 5/2018 | Linsalata | G06Q 50/01 |

* cited by examiner

*Primary Examiner* — Jared M Bibbee
(74) *Attorney, Agent, or Firm* — Daniel C. Pierron; Widerman Malek, PL

(57) ABSTRACT

A method of generating a dynamic hotspot map from social media information including performing a streaming social media data collection function that includes receiving a social media data stream, identifying social media objects therefrom, and writing a graph file responsive to the social media objects, performing a grapher function including applying network functions to the graph file and calculating characteristic values of nodes comprised by the graph file, and performing a mapping and interaction method including receiving a map selection, activity mode selection, and filter selection from a user and sending display information to the user responsive to the selections.

19 Claims, 14 Drawing Sheets

SYSTEM AND METHOD FOR GENERATING DYNAMIC HOTSPOT MAP FROM SOCIAL MEDIA INFORMATION AND INTERACTING WITH SAME

RELATED APPLICATIONS

This application claims priority under 35 U.S.C. § 119(e) of U.S. Provisional Patent Application Ser. No. 63/264,614 filed on Nov. 29, 2021 and titled System and Method for Generating Dynamic Hotspot Map from Social Media Information and Interacting with Same. The content of this application is incorporated herein by reference.

FIELD OF THE INVENTION

The present invention relates to systems and methods for generating dynamic hotspot maps of social media data and providing users to interact with the social media platforms responsive thereto.

BACKGROUND OF THE INVENTION

The quantity of data generated by social media requires novel means of visualizing that data in order for it to be understandable and actionable by users. Such visualizations have typically been constructed using static data, i.e. data collected substantially prior to analysis and review by the user. This time difference between when the data was collected and when it is visualized for the user is disadvantageous, given the rapidity with which discussions on social media platforms rise and fall. However, real-time analysis and visualization of social media data has heretofore proven unreliable, as those solutions have lacked robust analysis necessary to accurately identify trending subjects. Accordingly, there is a need in the art for a solution to real-time social media data analysis and visualization.

Additionally, users have lacked control over how social media data was analyzed and visualized. Fundamental assumptions about how to weight social media data objects based on characteristics of those objects have significant effects on the resulting visualization and how that visualization is interpreted by the user. Prior attempts to allow users to customize such visualizations have not addressed this underlying shortcoming of variable weighting. The desired weighting can vary based on priorities of the user, including what social media data objects or characteristics thereof are of primary interest. Accordingly, there is a need in the art for a social media data visualization solution that enables users to alter visualizations of social media data responsive to their individual priorities.

Moreover, prior solutions have typically delineated between visualization of social media data and the ability to interact on social media platforms. As a result, users face the burdensome task of accurately transferring the visualized information to another solution, typically another software platform, when interacting on social media platforms. This creates the opportunity for human error in terms of inaccurate transfers, which may take the form of engaging with the wrong user or post, interacting in a suboptimal manner, and increased time and expense in executing such interaction. Accordingly, there is a need in the art for reducing the opportunity and incidence of human error in acting on visualized social media data and reducing the time and cost (either in computational or human cost) in acting on the same data.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of generating a dynamic hotspot map from social media information and interacting with the same. The method may also include performing a streaming social media data collection function may include receiving a stream of social media data from a social media data stream source, identifying a plurality of social media objects from the stream of social media data, the plurality of social media objects may include a plurality of nodes and edges, writing the plurality of nodes and edges to a node and edge database, writing a graph object for each node or edge written to the node and edge database, the graph objects written to the node and edge database defined as a plurality of graph objects, and writing a graph file may include the plurality of graph object to a graph file database. The method may also include performing a grapher function that may include opening the graph file from the graph file database, applying one or more network functions to the graph file, producing one or more characteristic indicators for each graph object may include by the graph file, combining the characteristic indicators of each graph object with the graph objects that may include all data associated with a node, defining a plurality of hydrated nodes, calculating an exposure value of each hydrated node of the plurality of hydrated nodes, calculating a velocity value of each hydrated node of the plurality of hydrated nodes, calculating a momentum value of each hydrated node of the plurality of hydrated nodes, writing each of the exposure value, velocity value, and momentum value, collectively defined as time series data, for each hydrated node of the plurality of hydrated nodes to the graph object database the graph object and time series data associated therewith for all hydrated nodes of the plurality of hydrated nodes being defined as the graph object data, and exporting the graph object data of the graph object database to a front-end mapping and interaction module. The method may also include performing a mapping and interaction method that may include receiving a map selection from a user device, the map selection may include an instruction to display the graph object data received at the front-end mapping and interacting module, receiving an activity mode selection from the user device; receiving one or more filter selections from the user device, and sending display information to the user device for displaying as a map the graph object data received at the front-end mapping and interacting module responsive to the map selection, the activity mode selection, and the one or more filter selections, defining a plurality of displayed graph objects, the plurality of displayed graph objects may include a plurality of displayed nodes. Other embodiments of this aspect include corresponding computer systems, apparatus, and computer programs recorded on one or more computer storage devices, each configured to perform the actions of the methods.

Implementations may include one or more of the following features. In some embodiments, the activity mode selection is an activity mode configured to facilitate at least one of a target mode defined as identifying larger groups having high consensus around a single topic, a shape mode defined as identifying engaged social media users and relevant conversations outside an immediate network of a user associated with the user device, and an amplify mode defined as identifying real-time social trends having characteristics suggesting virality. The target mode may be defined by weighting the plurality of graph objects by the formula T=0.5*q+0.3*kreply+0.15*krepost+0.05*knormalized favorite*exposure where t is the target score for the graph object, kreply is a quantity of replies to a social media object underlying the graph object, krepost is a quantity of reposts to the social media object underlying the graph object, knormalized favorite is a quantity of positive reactions to the social media object underlying the graph object, said quantity having been normalized by rescaling the number of positive reactions to a common scale, and exposure is a quantity of users on a social media platform that subscribe to or follow the user that created the social media object underlying the graph object. The shape mode may be defined by identifying groups in the target mode that have the greatest number of source edges, defined as identified groups; and placing the identified groups proximate to the center of the map may include the graph object data. The amplify mode may be defined by calculating a betweenness centrality velocity for each node associated with a user by determining a change in the betweenness centrality value that node; identifying nodes associated with a user having a comparatively greater betweenness centrality velocity compared to the other nodes associated with a user, defined as amplifying nodes; and configuring the display information sent to the user device for displaying as a map the graph object data to identify the amplifying nodes on the map displayed on the user device. The mapping and interaction method further may include receiving a node selection of the plurality of displayed nodes from the user device, sending display information to the user device for displaying information related to the node selection, sending display information to the user device for displaying engagement functions, and receiving an engagement selection from the user device. The streaming social media data function further may include writing a count of the nodes and edges associated with each status object into an event dataframe, and trimming at least one node or edge from the node and edge database by performing the steps of identifying an oldest status object and associated graph object in the event dataframe, deleting the associated one or more associated grid objects from the node and edge database, and removing the count of the status object from the event dataframe. Implementations of the described techniques may include hardware, a method or process, or computer software on a computer-accessible medium.

One general aspect includes a system for generating a dynamic hotspot map from social media information and interacting with the same. The system may also include a node and edge database stored on a non-transitory storage medium that may include a plurality of nodes, edges, and graph objects written thereto, the nodes, edges, and a plurality of graph objects being generated by a streaming social media data collection function, the streaming social media data collection function may include receiving a stream of social media data from a social media data stream source, identifying a plurality of social media objects from the stream of social media data, the plurality of social media objects may include a plurality of nodes and edges, writing the plurality of nodes and edges to the node and edge database, writing a graph object for each node or edge written to the node and edge database, the graph objects written to the node and edge database defining the plurality of graph objects, and writing a graph file may include the plurality of graph object to a graph file database. The system may also include the graph file database stored on a non-transitory storage medium, may include a graph file that may include the plurality of graph objects may include by the node and edge database. The system may also include a graph object database stored on a non-transitory storage medium may include graph object data written thereto, the graph object data being generated by a grapher function, the grapher function may include opening the graph file from the graph file database, applying one or more network functions to the graph file, producing one or more characteristic indicators for each graph object may include by the graph file, combining the characteristic indicators of each graph object with the graph objects that may include all data associated with a node, defining a plurality of hydrated nodes, calculating an exposure value of each graph object may include by the graph file, calculating a velocity value of each graph object may include by the graph file, calculating a momentum value of each graph object may include by the graph file, writing each of the exposure value, velocity value, and momentum value, collectively defined as time series data, for each graph object may include by the graph file to the graph object database, the graph object and time series data associated therewith for all graph objects being defined as the graph object data, and exporting the graph object data may include by the graph object database to a front-end mapping and interaction module. The system may also include a map server may include a social media stream module operable to perform the streaming social media data collection function, a graph object calculation module operable to perform the grapher function, and a map display module configured to perform a mapping and interaction method operable to receive a map selection from a user device, the map selection may include an instruction to display the graph object data received at the front-end mapping and interacting module, receive an activity mode selection from the user device, the activity mode selection being an activity mode configured to facilitate at least one of identifying larger groups having high consensus around a single topic, defining a target mode, identifying engaged social media users and relevant conversations outside an immediate network of a user associated with the user device, defining a shape mode, and identifying real-time social trends having characteristics suggesting virality, defining an amplify mode. The system may also include receive one or more filter selections from the user device, and send display information to the user device for displaying as a map the graph object data received at the front-end mapping and interacting module responsive to the map selection, the activity mode selection, and the one or more filter selections, defining a plurality of displayed graph objects, the plurality of displayed graph objects may include a plurality of displayed nodes. The system may also include a processor positioned in communication with the non-transitory storage media on which the node and edge database, the graph file database, and the graph object database and operable to execute each of the social media stream module, the graph object calculation module, and the map display module, and a network communication device positioned in communication with the processor and operable to communicate across a computer network. Other embodiments of this aspect include corresponding computer systems, apparatus, and computer programs recorded on one or more computer storage devices, each configured to perform the actions of the methods.

Implementations may include one or more of the following features. The system where the activity mode selection is an activity mode configured to facilitate at least one of identifying larger groups having high consensus around a single topic, defining a target mode, identifying engaged social media users and relevant conversations outside an immediate network of a user associated with the user device, defining a shape mode, or identifying real-time social trends having characteristics suggesting virality, defining an amplify mode. The target mode may be defined by weighting the plurality of graph objects by the formula $T=0.5*q+0.3*kreply+0.15*krepost+0.05*knormalized favorite*exposure$ where t is the target score for the graph object, kreply is a quantity of replies to a social media object underlying the graph object, krepost is a quantity of reposts to the social media object underlying the graph object, knormalized favorite is a quantity of positive reactions to the social media object underlying the graph object, said quantity having been normalized by rescaling the number of positive reactions to a common scale, and exposure is a quantity of users on a social media platform that subscribe to or follow the user that created the social media object underlying the graph object. The shape mode may be defined by identifying groups in the target mode that have the greatest number of source edges, defined as identified groups, and placing the identified groups proximate to the center of the map may include the graph object data. The amplify mode may be defined by calculating a betweenness centrality velocity for each node associated with a user by determining a change in the betweenness centrality value that node, identifying nodes associated with a user having a comparatively greater betweenness centrality velocity compared to the other nodes associated with a user, defined as amplifying nodes, and configuring the display information sent to the user device for displaying as a map the graph object data to identify the amplifying nodes on the map displayed on the user device. The mapping and interaction method further may include receiving a node selection of the plurality of displayed nodes from the user device, sending display information to the user device for displaying information related to the node selection, sending display information to the user device for displaying engagement functions, and receiving an engagement selection from the user device. The streaming social media data function further may include writing a count of the nodes and edges associated with each status object into an event dataframe, and trimming at least one node or edge from the node and edge database by performing the steps of identifying an oldest status object and associated graph object in the event dataframe, deleting the associated one or more associated grid objects from the node and edge database, and removing the count of the status object from the event dataframe. Implementations of the described techniques may include hardware, a method or process, or computer software on a computer-accessible medium.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a method, and system for performing the method, of receiving and parsing social media data, parsing the social media data, generating characteristic metadata regarding the parsed social media data, generating a graphical representation of the parsed social media data responsive to the characteristic metadata, and facilitating user interaction with social media posts thereof.

Figure 1:
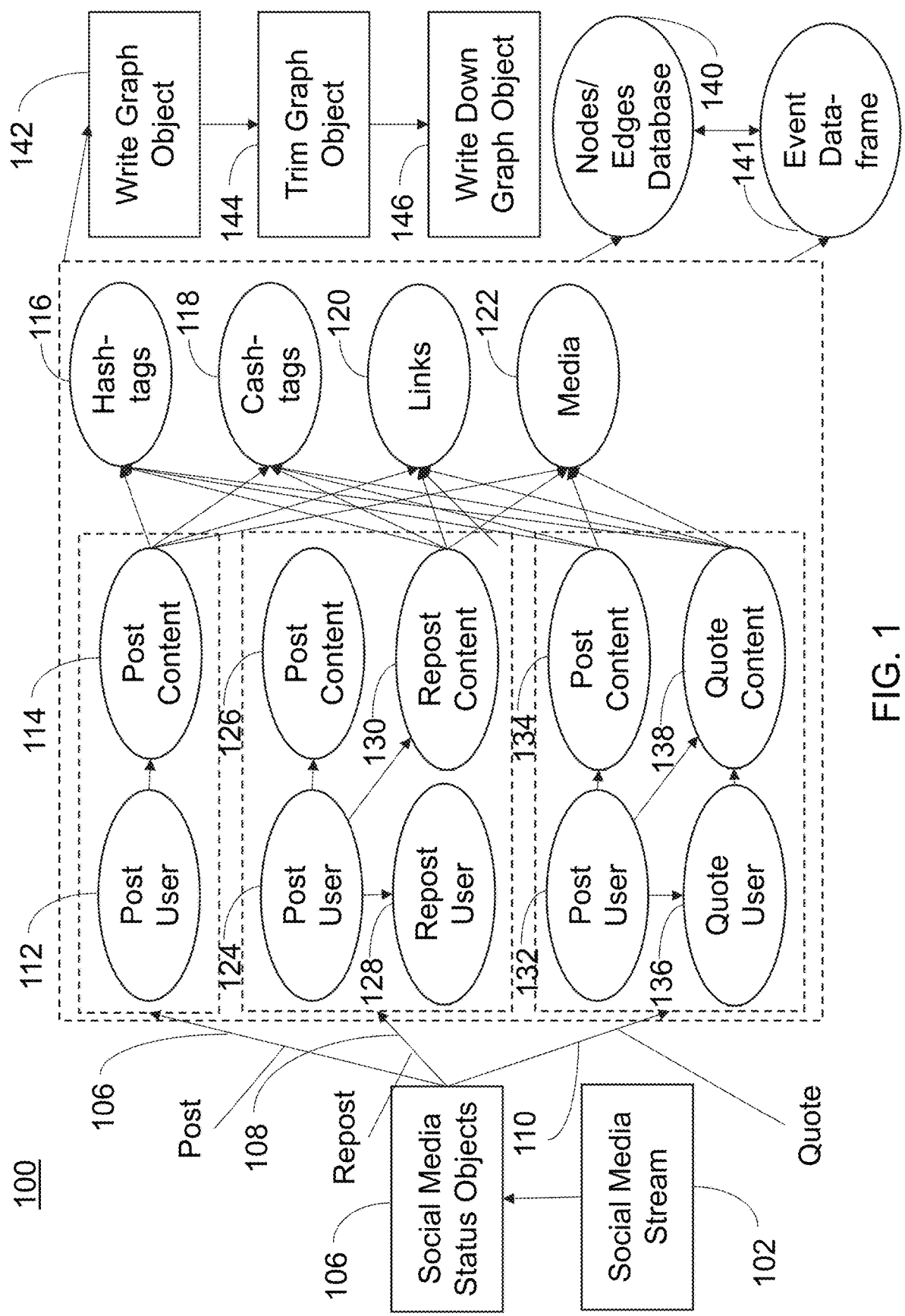
FIG. 1 is a schematic representation of a method of reading in social media data, parsing the social media data, and generating graph object, nodes, and edges for graphical representation of the social media data according to an embodiment of the invention.
Figure 2:
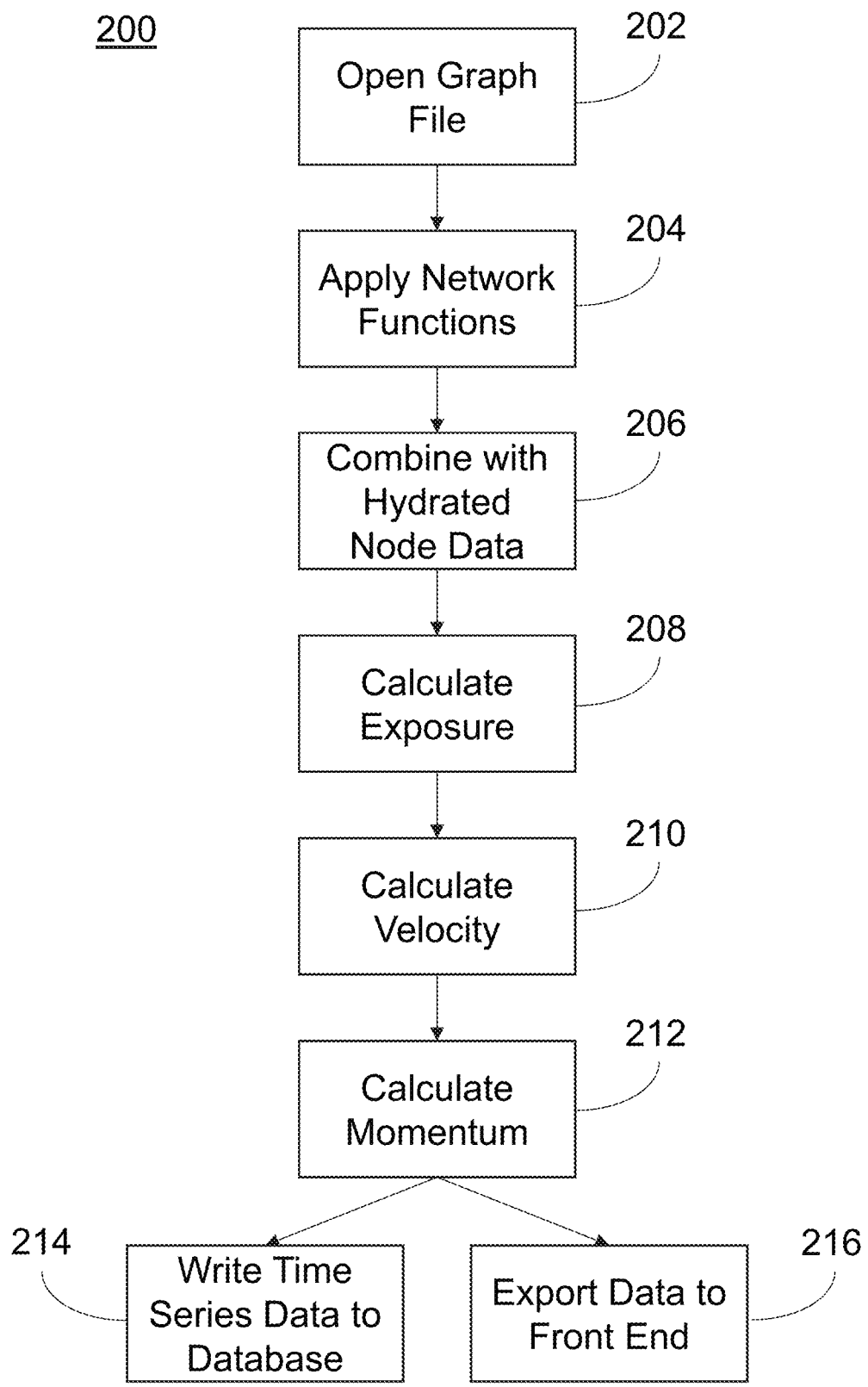
FIG. 2 is a flowchart illustrating a grapher function method according to an embodiment of the invention.
Figure 3:
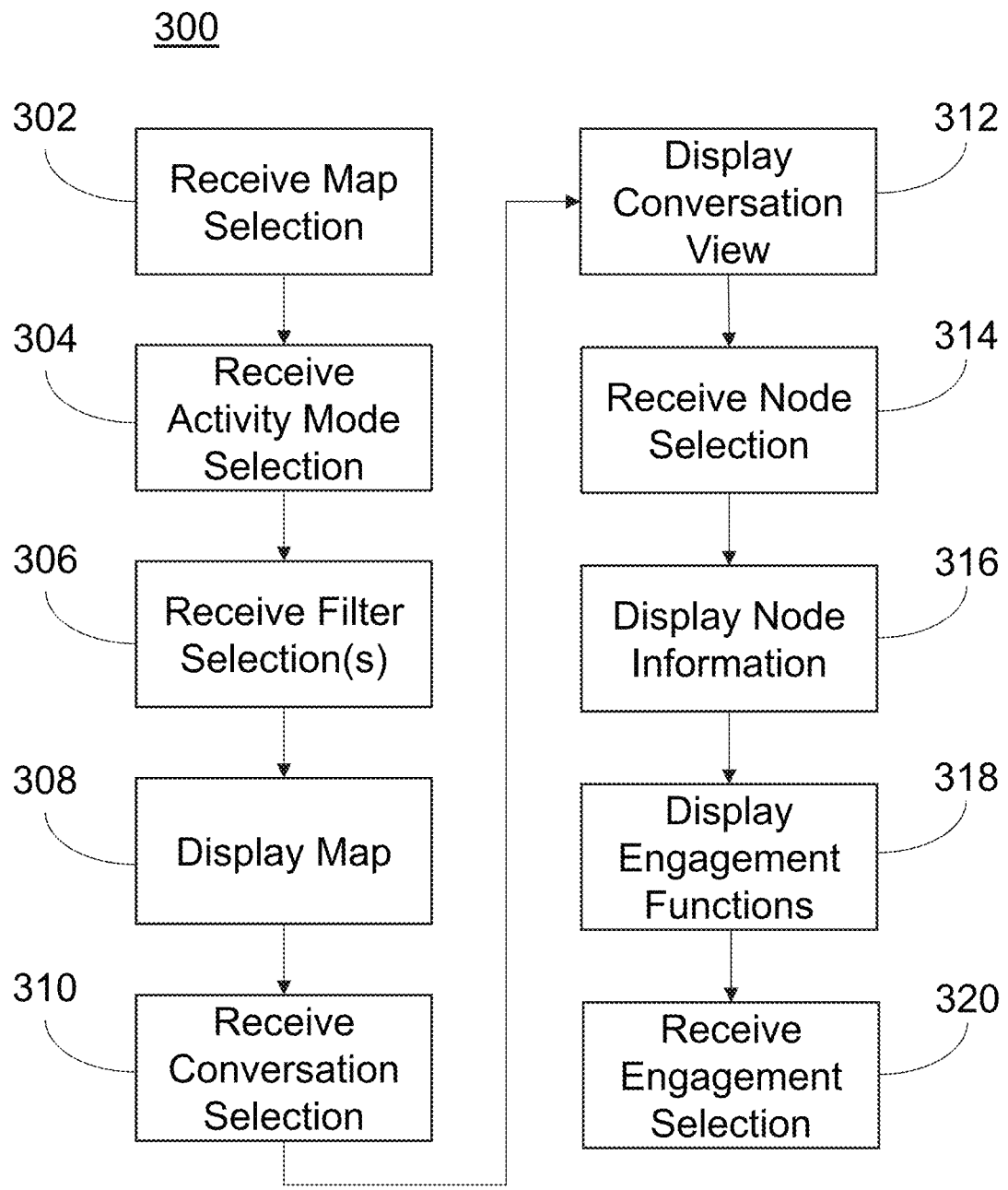
FIG. 3 is a flowchart illustrating a front-end mapping and interaction method according to an embodiment of the invention.

Referring now to FIGS. 1-3, methods according to embodiments of the invention are presented. A first streaming social media data function method 100 is presented in FIG. 1. The streaming social media data function method 100 of the present embodiment may enable receiving social media data, parsing it for relevant constituent data, and generating graphical representation elements therefrom. The streaming social media data function method 100 may be referred to as a streamer function. The streaming social media data function method 100 may begin at 102 with receiving a stream of social media data from a social media data source. Such a social media data source may be any source of social media information that may be accessible and provide information regarding social media posts, reposts, quotes, and/or other social media interactions, including, but not limited to, likes, shares, and any other social media interaction as is known in the art. While the streaming social media data function method 100 is applicable to any source of social media data associated with any social media platform, the platforms of Twitter, Facebook, Instagram, WhatsApp, YouTube, TikTok, Snapchat, Weibo, Discord, Reddit, Twitch, and the like are specifically contemplated and included within the scope of the invention. Such social media streams may be accessible over a wide area network, such as the Internet, utilizing an application programming interface (API) or any other interfacing protocol as is known in the art.

The streaming social media data function method 100 may continue at 104 with identifying social media status objects received from the social media data stream at 102. The social media status objects identified at 104 may reflect the types of objects made available by the application interface for the social media data stream. The present embodiment comprises posts 106, reposts 108, and quotes 110. These types of status objects are exemplary only and do not limit the scope of types of status objects that may be identified at 104. Each status object 106, 108, 110 may comprise sub-elements. The status objects 106, 108, 110 may be recorded to a database on a server. Moreover, the time the status object 106, 108, 110 was either generated by the user on the relevant social media platform or received at 104 may be saved along with the status object.

Posts 106 may be understood as content a user makes available on a social media platform for viewing by other users on that platform. Commonly referred to as "posts" on social media platforms, posts 106 may be referred to using different terms on certain platforms, such as "tweets" on Twitter and "snaps" on Snapchat (when including images). Posts 106 may comprise sub-elements including a post user 112 and a post content 114. The post user 112 may be the user account registered with the social media platform that created the post. The post user 112 may comprise one or more of a variety of types of data, including, but not limited to, a username, a given name, a surname, a user location (either temporary/immediate or permanent), a user device, and any other identifying information, as well as information about the user's account, including verification status (e.g. Twitter "blue check"), number of followers, and the like. The post content 114 may comprise the substance of the post made by the post user 112. Post content 114 may include, but is not limited to, text, images, video, audio, links/hyperlinks to other accessible content, metadata tags, such as hashtags (metadata tag preceded with hash symbol "#") and/or cashtags (metadata tags preceded with a currency symbol, commonly the dollar symbol "$"), a link to another user on the platform (e.g. @username), and any other content known to be included in a social media post. The sub-elements identified in the post content 114 may be added to lists of sub-elements identified by the streaming data function method 100. Examples of lists of sub-elements includes, but are not limited to, hashtags 116, cashtags 118, links 120, and media 122. These lists are exemplary only and non-limiting, and lists for other types of sub-elements are contemplated and included within the scope of the invention. Such lists may be stored in the same database as the database of the status objects 106, 108, 110 on the same server or may be stored in a separate database on the same server or a separate server. In some embodiments, where duplicative list entries are encountered (e.g. the same hashtag is used on different posts), an indication of the number of social media status objects comprising that sub-element may be recorded on the entry for that sub-element.

Similarly, reposts 108, which may be understood as posting the content of another user's post with an indication that the source of the post is another user. Reposts 108 may comprise sub-elements of the original post user 124, the original post content 126, the repost user 128, and the repost content 130. The repost user 128 may be a user registered on the social media platform from which the repost 108 originates. While the repost user 128 will most commonly be registered on the same social media platform as the post user 124, it is contemplated and included within the scope of the invention that cross-platform reposting may occur and be reflected in the post user 124 content and the repost user 128 content.

The repost content 130 may comprise sub-elements similar to the types of sub-elements comprised by the post content 114. In some elements, the content of the repost content 130 may be identical to the content of the post content 126. The sub-elements of the repost content 130 may be added to the lists 116, 118, 120, 122. While in the present embodiment the sub-elements of the post content 126 may not be added to the lists 116, 118, 120, 122, it is contemplated and included within the scope of the invention that those sub-elements may be added to the lists 116, 118, 120, 122, and in further embodiments the post content 126 may comprise an indication whether the sub-contents thereof have previously been added to the lists 116, 118, 120, 122 and if they have, not add the sub-elements, and if they have not, then the sub-elements may be added. In such embodiments, the post content 126 may be evaluated to determine the sub-elements. In some further embodiments, the post content 126 may not be evaluated to determine the sub-elements. In many embodiments the content of the Repost content 130 may be identical to the content of the post content 126, and therefore adding the sub-elements of the post-content 126 would be duplicative of the repost content 130 and therefore unnecessary.

Similarly, quotes 110, which may be understood as similar to a repost in that a post made by another user is posted again by the quoting user but differs in that the quoting user provides their own content that is additional to the content of the post they are quoting. Quotes may comprise sub-elements of the original post user 132, the original post content 134, the quote user 136, and the quote content 138. The quote user 136 may be a user registered on the social media platform from which the quote 110 originated. While the quote user 136 will most commonly be registered on the same social media platform as the post user 132, it is contemplated and included within the scope of the invention that cross-platform reposting may occur and be reflected in the post user 132 content and the quote user 136 content.

The quote content 138 may comprise sub-elements similar to the types of sub-elements comprised by the post content 114. In some elements, the content of the quote content 138 may be identical to the content of the post content 134. The sub-elements of each of the quote content 138 and the post content 134 may be added to the lists 116, 118, 120, 122.

The streaming social media data function method 100 may continue by writing a plurality of nodes and edges to a node and edge database at 140. Nodes and edges may combine to form an object graph, defining hotspot map of the present invention. Specifically, nodes may be understood as vertices that may be connected, and edges may connect two or more nodes. Each post user 112, 124, 132, post content 114, 126, 134, repost user 128, repost content 130, quote user 136, and quote content 138 may be recorded as a node in the database 140. Furthermore, each entry in the respective hashtags 116, cashtags 118, links 120, and media 122 links may also be added as nodes into the database 140. Additional details regarding nodes and edges are provided below. Nodes and edges may be written to the database in a streaming, real-time basis as social media status objects are received and parsed.

The streaming social media data function method 100 may further comprise writing a count of the nodes and edges associated with each status object (post 106, repost 108, and quote 110) received at 106 and parsed by the streaming social media data function method 100 into an event dataframe 141. Each count may include the time the status object was received and the nodes/edges associated with the status object.

The streaming social media data function method 100 may continue at 142 with writing a graph object for each node/edge written to the node/edge database 140. The streaming social media data function method 100 may continue at 144 with trimming graph objects (e.g. nodes or edges) from the node/edge database 140. As mentioned above, nodes and edges are written in real-time as social media status objects are received and parsed, the size of the node/edge database 140 will grow. When the node/edge database 140 reaches a predefined size, step 144 may comprise identifying the oldest status object and associated graph objects in the event dataframe 141, delete the associated grid objects from the node/edge database 140, and remove the count of that status object from the event dataframe 141. The predetermined sized may be determined based on the needs of the user and the capabilities of the hardware performing the streaming data function method 100. Any predetermined size is contemplated and included within the scope of the invention.

The streaming social media data function method 100 may continue receiving and parsing status objects and writing grid objects derived therefrom for a predetermined length of time. The length of time may be determined responsive to the needs of the user and the capabilities of the hardware performing the streaming data function method 100. When the predetermined length of time has elapsed, the streaming social media data function method 100 may continue at 146 with writing down a graph file at 146. The graph file may be a single file comprising the graph objects written to the graph object database 142 during the predetermined length of time, excluding those graph objects trimmed at 144. The graph file may be written to a graph file database, as discussed in additional detail below. References to the graph file may be understood as the same as referring to the graph objects, the plurality of graph objects, etc. Upon writing down the graph file at 146, the event dataframe 141 and graph object database 144 may be cleared to contain no entries, and the streaming social media data function method 100 may restart at 102 with receiving data from the social media datastream, identifying and parsing social media status objects, etc.

Referring now to FIG. 2, another method, namely, a grapher function 200 according to an embodiment of the present invention is presented. The grapher function method 200 may perform a graphing function to graph objects written as a graph file in the social media streaming function method 100. The grapher function method 200 may comprise opening a graph file comprising a plurality of graph objects at 202. The grapher function method 200 may continue at 204 with applying network functions to the graph objects comprised by the graph file. The network functions comprise the application of multiple functions to determine characteristics of each graph object within the overall object map created by the graph file. Such characteristics include, but are not limited to, pagerank, betweenness centrality, and modularity class. Formulae for calculating these characteristics are known in the art. Pagerank is analogous to the PageRank algorithm utilized in Google Search in the ranking of web pages, where the number and quality of connections for each graph object are calculated. Specifically, the connections for each graph object will be quantified, given a quality indication score, and an overall pagerank score responsive thereto will be determined. The pagerank score will provide a relative likelihood that the node is the termination point of any one route through the network, thus determining the relative importance of a nod within the network of graph objects. In the present embodiment, nodes generated from hashtags, cashtags, links, and media will tend to have greater pagerank scores than nodes generated from users and posts.

The betweenness centrality characteristic may be understood as the likelihood that a given path through the resulting object map from the plurality of graph objects will route through the node. The shortest path between two nodes is calculated and edges and nodes to go from one node to another are identified. The betweenness centrality of each graph object may be the number of shortest paths that route through that object or the sum of the weight of those paths, for embodiments where paths are weighted. In the present embodiment, nodes generated from users and posts will tend to have greater betweenness centrality than nodes generated from hashtags, cashtags, links, and media.

The modularity class may be understood as the level at which nodes are grouped together, with high modularity indicating groups with dense connections within the group and little interconnection between graph objects in different groups and low modularity indicating groups with comparatively less dense connections between graph objects within the groups and more interconnection between graph objects in different groups.

The characteristics of pagerank, betweenness centrality, and modularity class may be quantified and combined to generate a score for each graph object. Moreover, each characteristic may be weighted to give more or less importance to each characteristic, resulting in different scores for each graph object responsive to the weighting.

These network functions will generate outputs having forms that vary by graph object. Nodes will be integers (reflecting a single node) and edges will be tuples (reflecting connection to tow nodes), as well as the individual pagerank, betweenness centrality, and modularity scores. The grapher function method 200 may continue at 206 with combining the outputs (integer/tuple scores and pagerank, betweenness centrality, and modularity class) of the network functions performed at 204 with the graph objects that comprise all data associated with the node as identified in the streaming social media function method 100 (e.g. username, post content, etc.), to define a hydrated node.

Once combined, the grapher function method 200 may continue at 208 with calculating the exposure of each hydrated node. The exposure may be understood as the reach of a hydrated node within the graph map. The exposure may be calculated to be directly proportionate to certain types of hydrated node information that reflect the reach of the related social media status object, including, but not limited to, the number of followers of the original post user, the number of followers of each repost or quote user, and the number of interactions with each social media status object. In some embodiments, the exposure may be a sum of the followers of the social media status objects associated with the hydrated node.

The grapher function method 200 may continue at 210 with calculating a velocity of each hydrated node. The velocity may be understood as nodes of certain types having a temporal change in at least one hydrated node characteristic and/or score (i.e. output of network functions from step 204). A greater velocity value may be directly related to increases in at least one hydrated node characteristic and/or score, and a lower velocity value may be directly related to decreases in at least one hydrated node characteristic and/or score. The temporal aspect may be measured by comparing hydrated node having certain shared elements, including, but not limited to, at least one of username, text content, media content, hashtag, cashtag, link, and any other element of the hydrated node. The time recorded for each status object received at 104, being one or both of the time the status object was posted to the social media platform and the time the status object was received, may determine the magnitude of the change in time. The velocity may be inversely proportionate to the magnitude of the time difference between hydrated node. Specifically, for a given change in a hydrated node characteristic or score, such a change occurring over a small length of time will result in a greater velocity value and a such a change occurring over a greater length of time will result in a smaller velocity value.

The grapher function method 200 may continue at 212 with calculating a momentum of each hydrated node. The momentum may be the product of multiplying the exposure of the graph object with the velocity of the hydrated node. The grapher function method 200 may then continue at 214 with writing each of the exposure, velocity, and momentum values (defining "time series data") for each hydrated node to the graph object database and at 216 with exporting the graph object data to a front-end mapping and interaction module, as discussed in detail herein below.

Referring now to FIG. 3, as well as FIGS. 4-12, a mapping and interaction method 300 of displaying graph node objects defined in methods 100 and 200 and facilitating user interaction therewith is presented. The mapping and interaction method 300 may start at 302 with receiving a map selection from the user. Such a map selection may take the form of a user selecting a graph file from the graph object database as described hereinabove. Alternatively, where such a graph file database comprises multiple related graph files organized by a common feature (time, subject matter/topic, social media platform) defining map collections, and the user may select a graph file from such collections. The mapping and interaction method 300 may continue at 304 with receiving an activity mode selection from the user. The activity mode selection at 304 may determine certain characteristics of the map that is eventually presented to the user. A first activity mode the user may select may be configured to identify larger groups that have high consensus around a single topic, as may be indicated by the number of reposts, interactions, use of the same hashtag, use of the same cashtag, and inclusion of the same link, defining a Target activity mode. A formula for weighting the characteristics of the graph objects when the Target activity mode is selected is as follows:

$$T=(0.5*q+0.3*k_{reply}+0.15*k_{repost}+0.05*k_{normalized\ favorite})*\text{exposure}$$

where T is the Target score for the graph object, $k_{reply}$ is the quantity of replies to the social media status object underlying the graph object, $k_{repost}$ is the quantity of reposts to the social media status object underlying the graph object, $k_{normalized\ favorite}$ is the quantity of "favorites" or positive reactions to the social media status identobject underlying the graph object, said quantity having been normalized by rescaling the number of positive reactions to a common scale, and exposure is the quantity of users on the social media platform that subscribe to or follow the user that created the social media status object underlying the graph object.

A second activity mode the user may select may be configured to facilitate the user's ability to identify engaged social media users and relevant conversations outside the immediate network of the user, defining a Shape activity mode. When the Shape activity mode is selected, the map may be presented by identifying groups drawn in the Target mode that have the greatest number of source edges, namely those with the greatest numbers of connections between graph objects, and centering those groups in the map.

A third activity mode the user may select may be configured to identify real-time social trends having characteristics that suggest virality, defining an Amplify activity mode. When the Amplify activity mode is selected, the map may be presented by identifying user nodes having the highest betweenness centrality velocity of all graph objects. The betweenness centrality velocity may be calculated as described above, being a change between the betweenness centrality score of the node between two points in time. In this embodiment, an increase in betweenness centrality will produce a positive betweenness centrality velocity and a decrease will produce a negative velocity, and the highest betweenness centrality velocity is the betweenness centrality velocity that is greatest in magnitude and positive.

Figure 4:
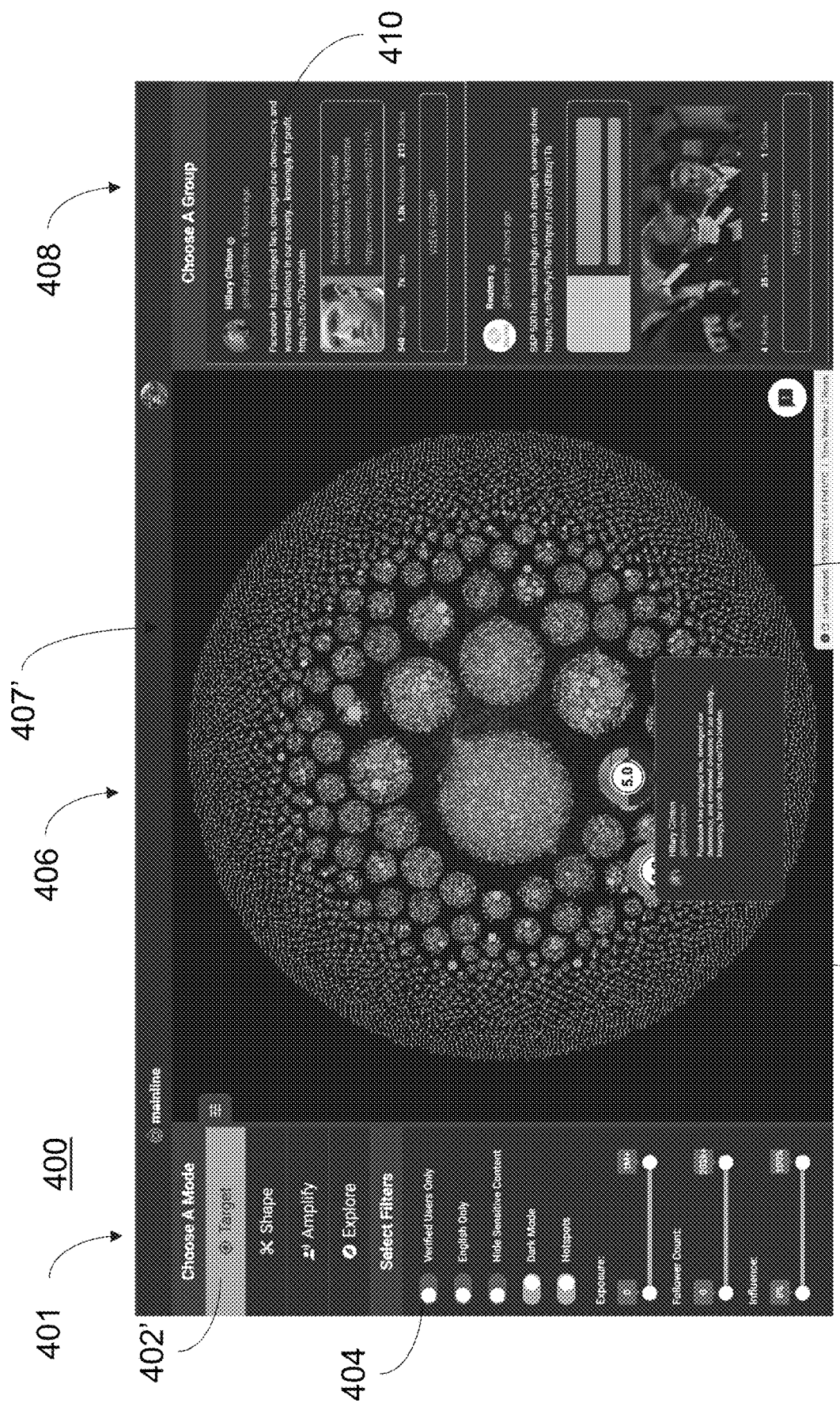
FIGS. 4-12 depict user interfaces of the mapping of and interaction with social media data according to an embodiment of the invention.
Figure 5:
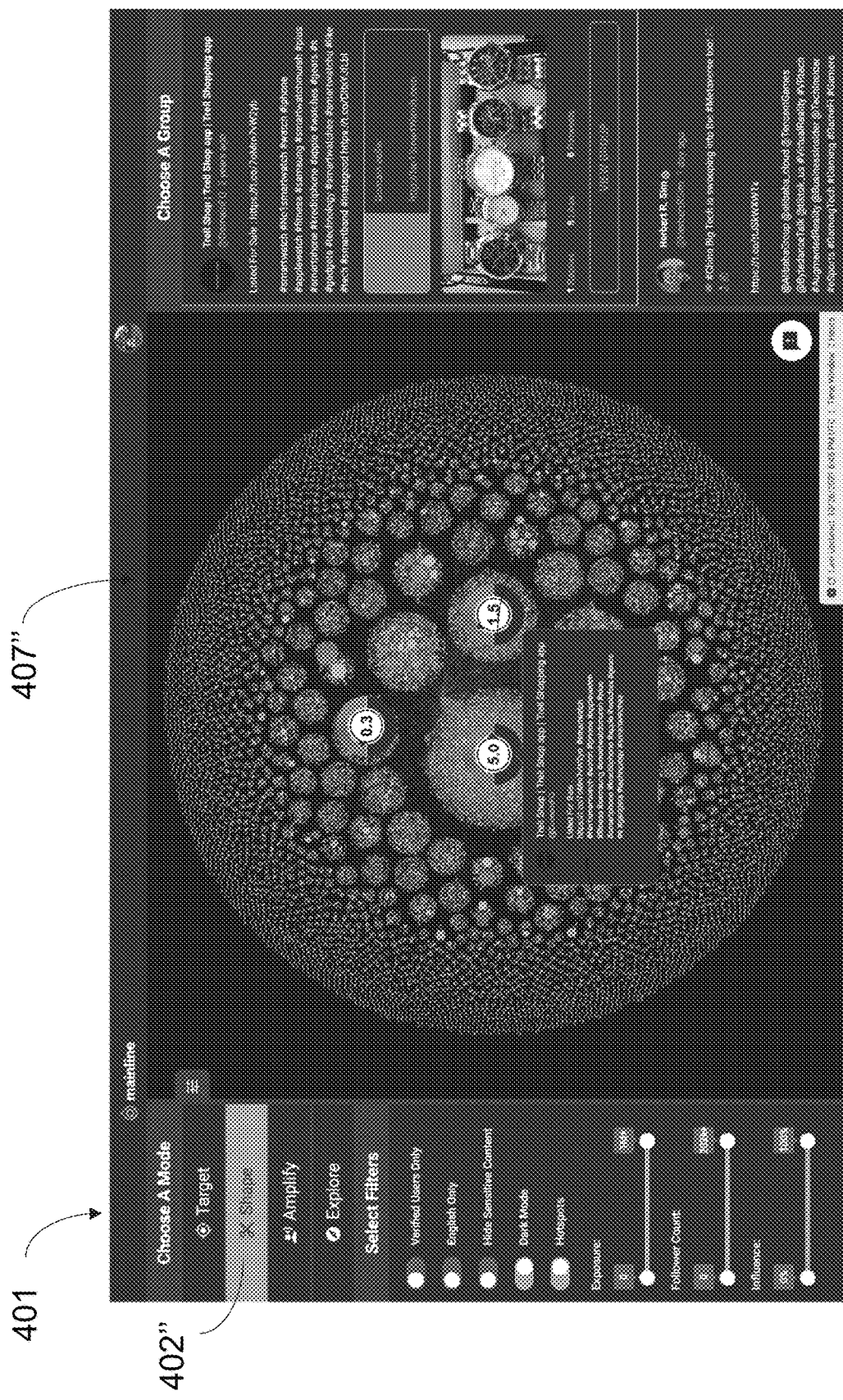
Figure 6:
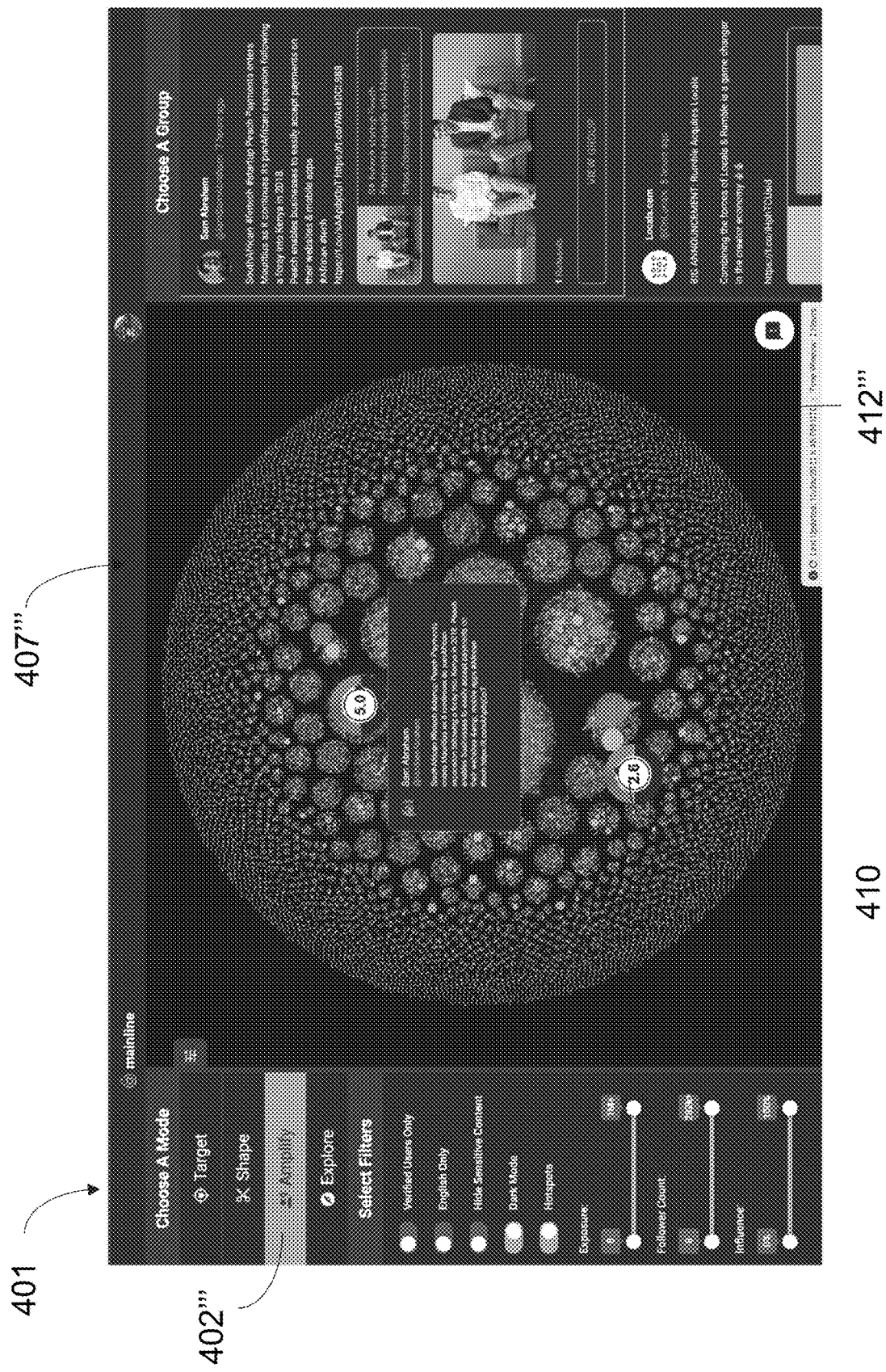
Figure 7:
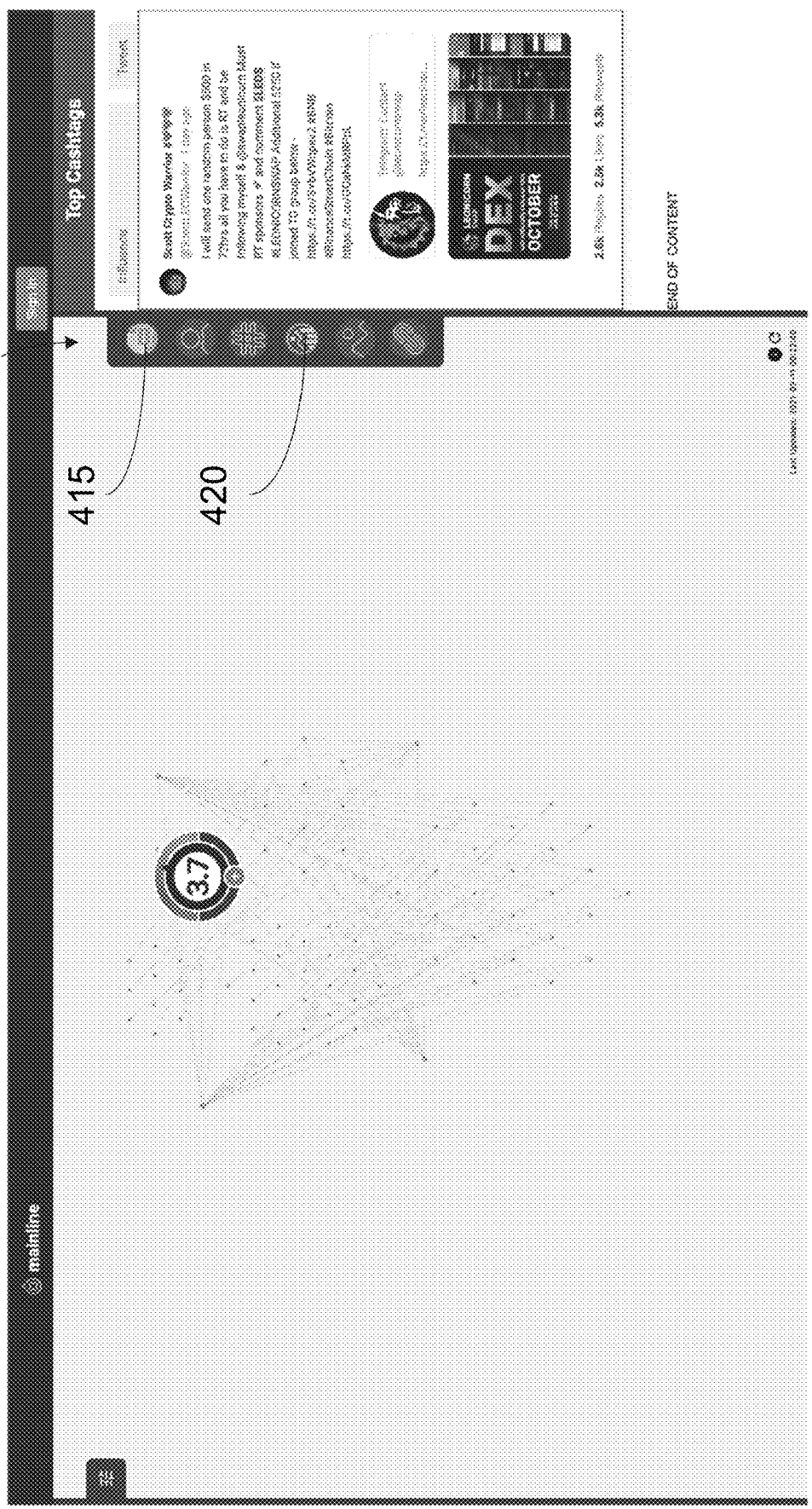
Figure 8:
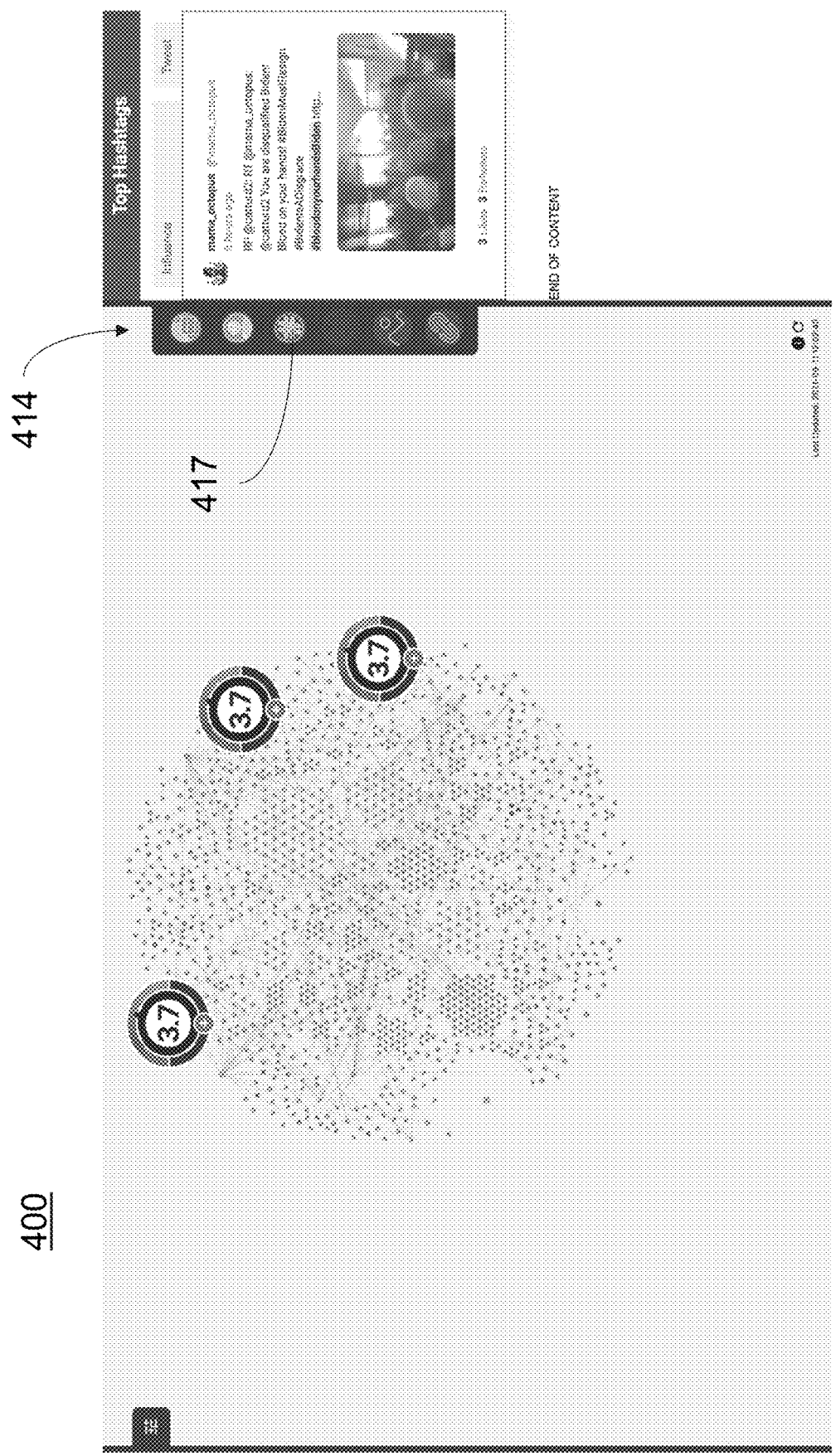
Figure 9:
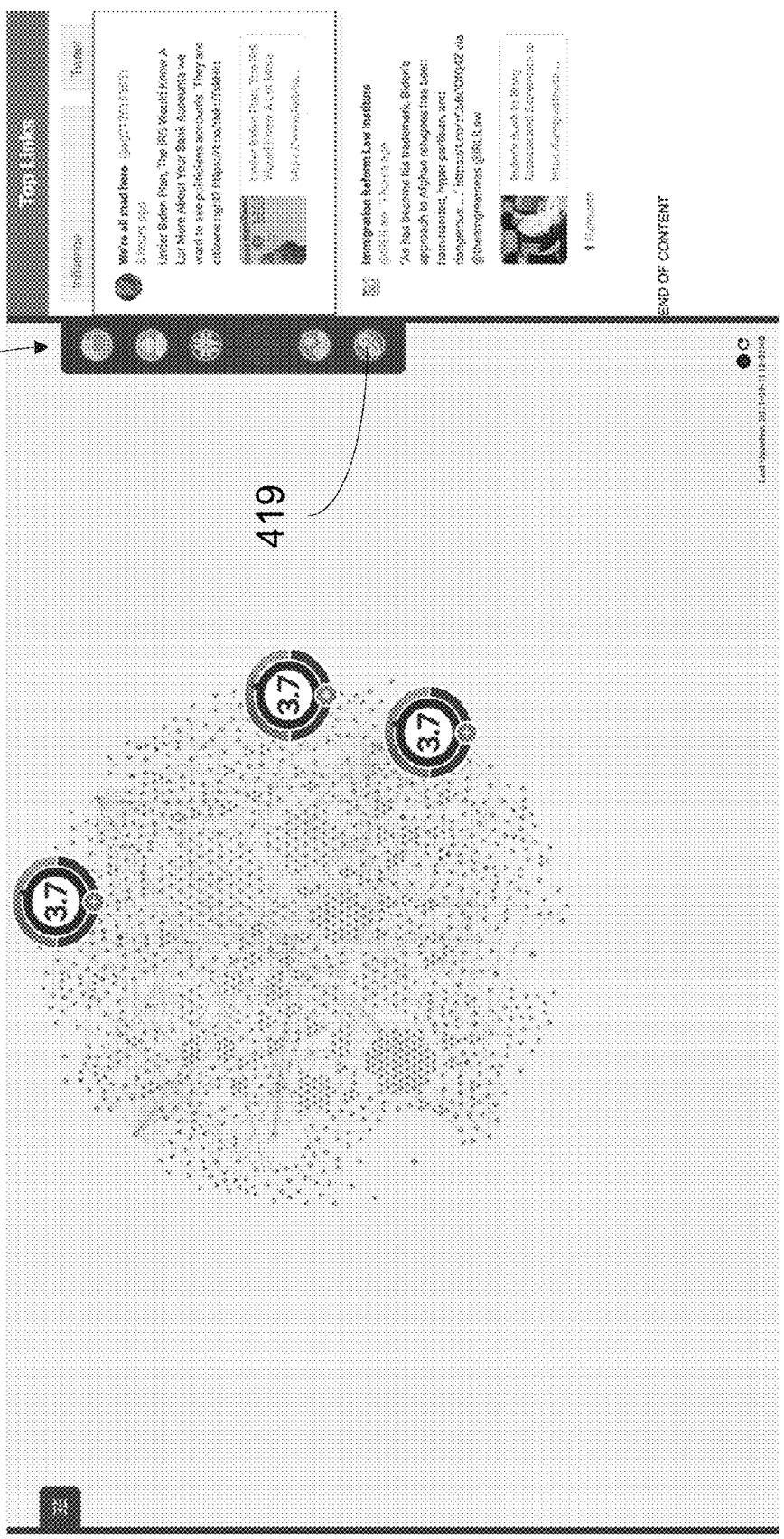
Figure 10:
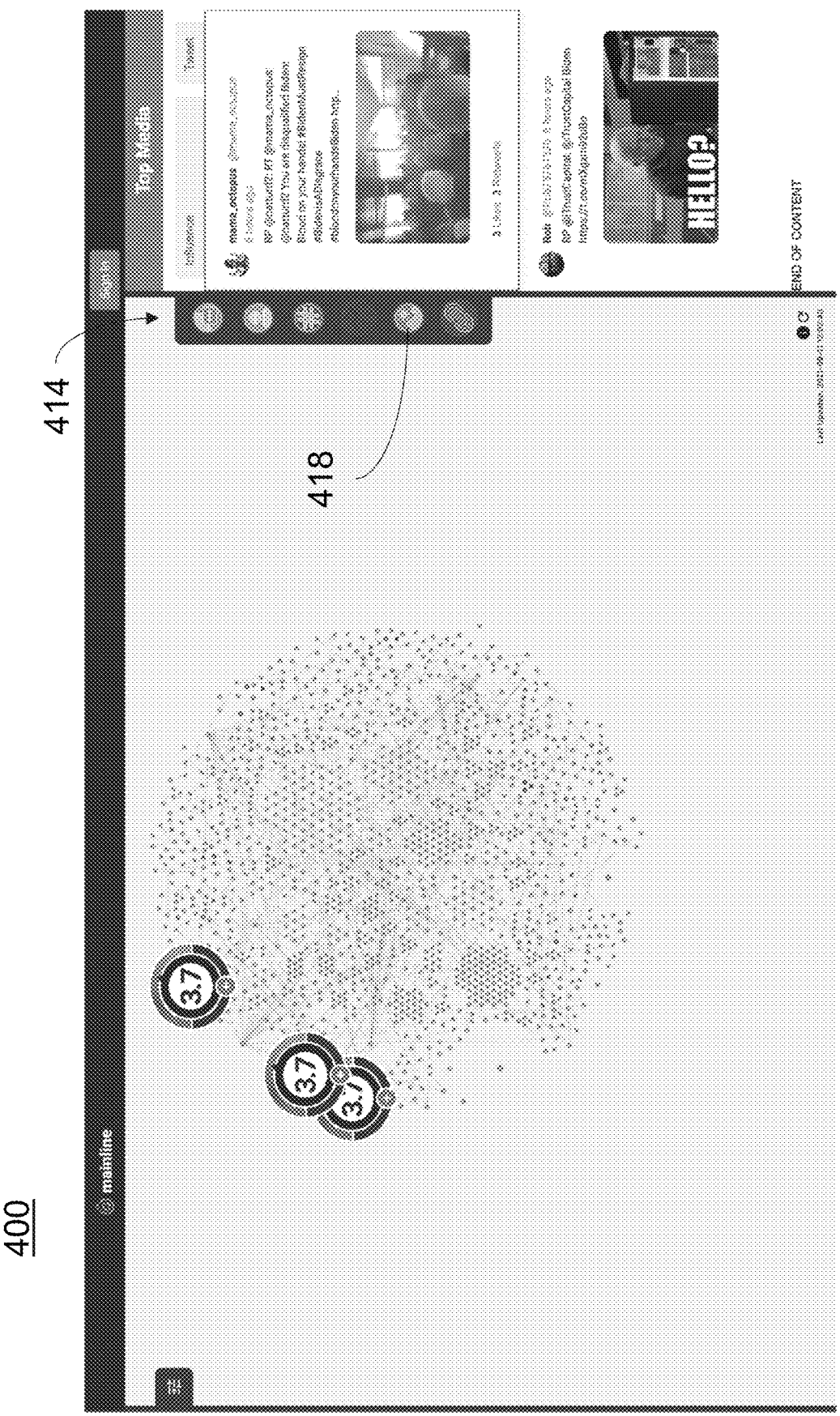
Figure 11:
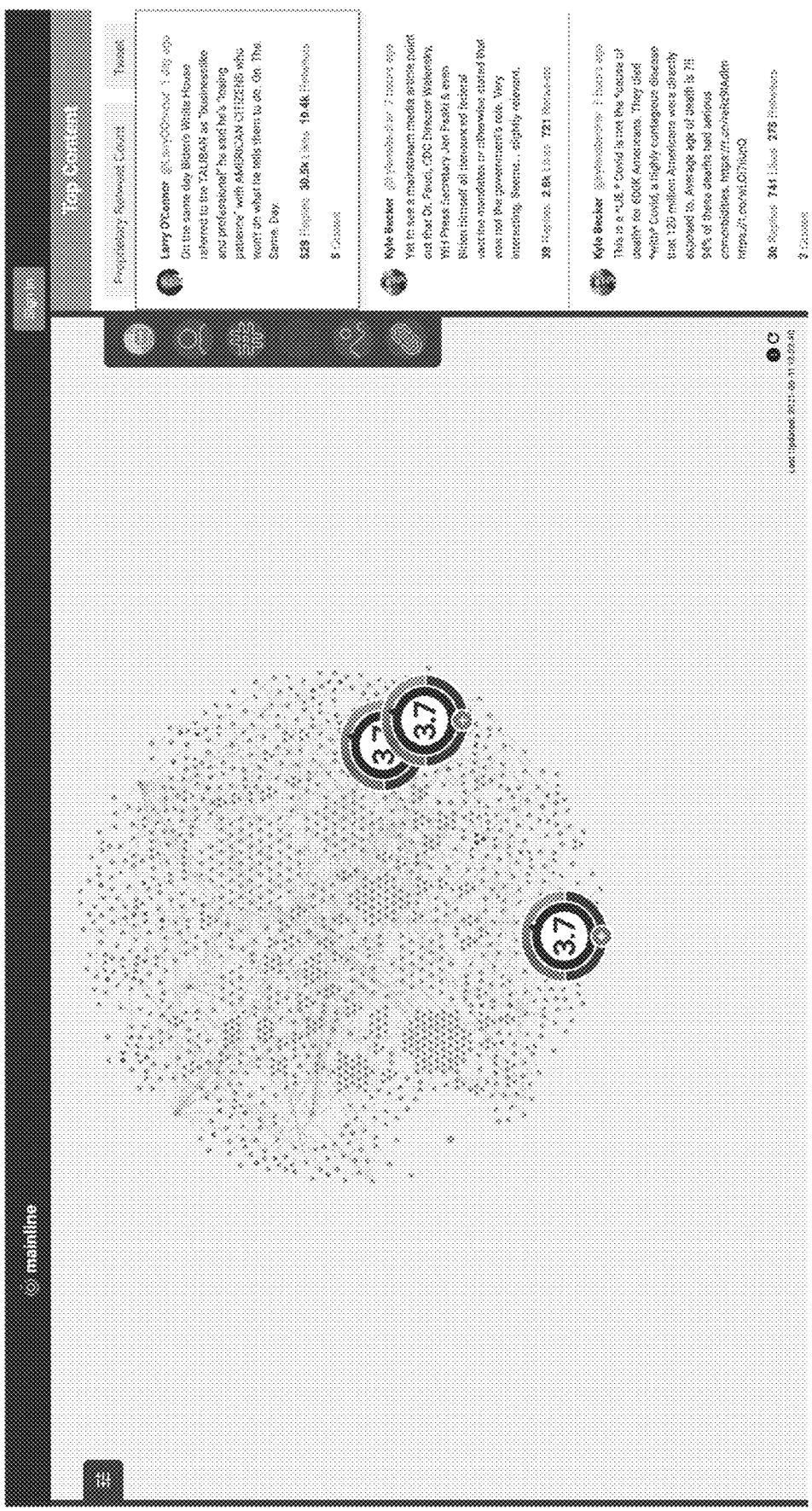
Figure 12:
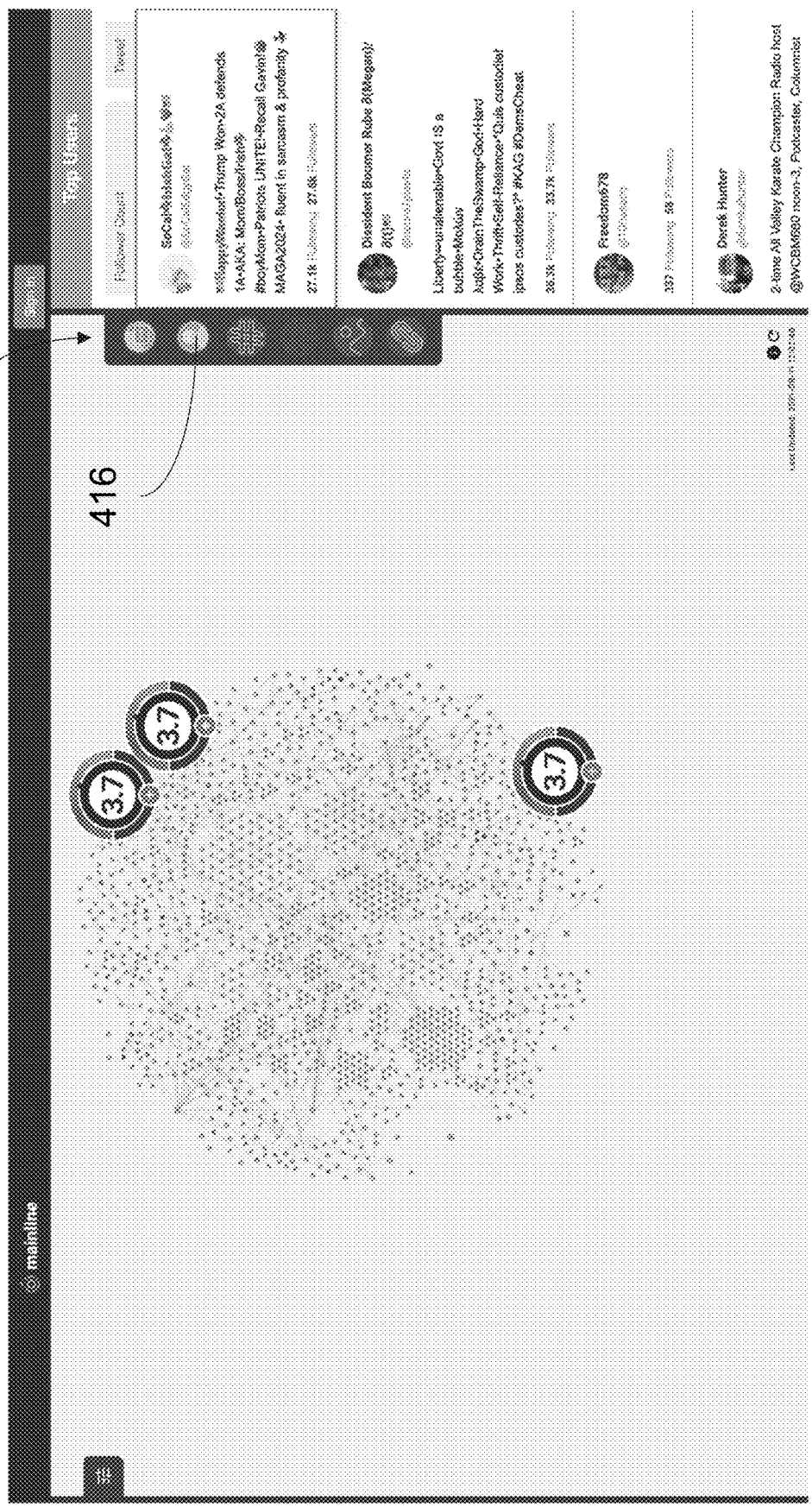

Referring now additionally to FIGS. 4-6, a user interface 400 depicting a map generated according to the present invention is presented. The user interface 400 may comprise an activity mode selection area 401 comprising a plurality of activity mode selectable elements 402, a filter selection area 403 comprising a plurality of filter selectable elements 404, a map area 406, and a group selection area 408. The activity mode selection area 401 may comprise a plurality of activity mode selectable elements 402, each activity mode selectable element 402 representing one of the activity modes (Target, Shape, and Amplify) as described above. In FIG. 4, the activity mode selectable element 402' associated with the Target activity mode is selected. In FIG. 5, the activity mode selectable element 402" associated with the Shape activity mode 402" is selected. In FIG. 6, the activity mode selectable element 402''' associated with the Amplify activity mode is selected. As can be seen in FIGS. 4-6, the map areas 406 of those user interfaces 400 display pluralities of graph objects 407', 407", 407''' therein having differing distributions. Those distributions of pluralities of graph objects 407', 407", 407''' will be distributed responsive to the selected activity mode, according to the formulae for those activity modes described above. In some embodiments, the user interface 400 may default to one of the activity modes and display the graph elements according to that activity mode. In such embodiments, the subsequent selection of an activity mode selectable element 402 other than the default may cause the map to be re-calculated and the graph elements re-deployed on the map according to the activity mode associated with the selected activity selectable element.

The user interface 400 may further comprise the display of one or more virality scores 410. The virality scores 410 may be calculated to represent a likelihood of the common characteristic of the group of graph objects having that common characteristic, referred to as a "conversation," causing them to be grouped, to go "viral," i.e. to become rapidly salient in public discourse. The virality score may be calculated for each conversation by normalizing the numerical output of the conversation in each activity mode to a common scale (e.g. 0 to 1) and multiplying by 5 to represent a weighted score of the sort order of the selected activity mode. Accordingly, a given conversation may have a different virality score in each activity mode.

The virality scores 410 may be displayed for one, some, or all conversations at or above a threshold number of graph elements within the associated group. The threshold number may vary dependent on the total number of graph elements within the map. Additionally, a user may make a selection using a user interface device, such as using a mouse to move a cursor over the conversation and clicking a button on the mouse or touching a region of a touchscreen display that the conversation is displayed. Additional details regarding receiving a conversation selection from the user will be provided herein below.

Continuing at 306, the method 300 may further comprise receiving one or more filter selections. The filter selections may control the types of nodes that may be displayed on the resulting map. Characteristics of the map itself, and other features, as well be discussed in detail below. As mentioned above, the user interface 400 comprises a filter selection area 403 comprising a plurality of filter selectable elements 404. Each selectable filter element may be associated with a mode of filtering the graph elements for display or exclusion on the user interface. Types of filters include, but are not limited to, verified users, language, sensitive content, display characteristics (such as light mode/dark mode), hotspots, the exposure of a given graph element, the follower count of graph elements associated with user graph elements, and an influence level of a given graph element. The filter selectable elements 404 may be of a type that facilitates its use with the nature of the filter associated therewith. For example, some filter selectable elements 404 may be toggles, indicating an on/off binary choice for the filter. Others may enable the user to designate a threshold value for the associated filtering characteristic, such as exposure, follower count, and influence. Such a filter selectable element 404 may take any form that enables the user to designate such a value, including a field to enter a number, a dial, and a slide bar. Any selectable elements as are known in the graphical user interface field are contemplated and included within the scope of the invention.

The method 300 may further comprise displaying the map on a display device of a user device 308. Such display may be effectuated by transmitting information that contains display information that may be rendered by an appropriate program on the user device to cause the display of the map. For example, HTML data may be transmitted to the device for display within a web browser as is known in the art. Moreover, data regarding the composition of the map may also be transmitted along with the HTML data that may be displayed in the browser and interacted with, as described herein below. Any method of effectuating the display of the user interface 400 on a user device as is known in the art is contemplated and included within the scope of the invention.

The method 300 may continue at 310 with receiving a conversation selection from the user. Such a selection may be received from a user input device as described above. The selection of the conversation may result in the display of a conversation view at 312. The conversation view is shown at 412 in FIGS. 4-6 and displays the common characteristic of the conversation. In FIG. 4, conversation view 412' presents a post from a user (namely a tweet on the Twitter platform from politician Hillary Clinton). Accordingly, the other graph elements of the selected conversation will all be related to this post in some way, being either a quote, repost, or share of the original post, a user that quotes, reposts, or shares, and the like. The virality score 410 for the selected conversation is also shown, being 5.0 (out of 5.0, so a high potential for virality). As shown in FIGS. 5, the conversation views 412" and 412''' for the selected conversations are both shown in the map area 206 and the group selection area 408.

Moreover, upon selecting a conversation, the user interface 400 may display the group associated with the selected conversation in the group selection area 408. As can be seen, the same post as shown in the conversation view 412' is shown in the group selection area 408', with additional content from the post being visible, namely, a linked website. In some embodiments, a plurality of groups comprised by the map and shown in the map area 406 may be shown in the group selection area 408, with the groups being selectable in the group selection area 408 as well as in the map area 406.

Additionally, as shown in FIGS. 7-12, the user interface 400 may comprise a plurality of focus item selectable elements 414. The plurality of focus item selectable elements 414 may correspond to various characteristics of the graph elements and cause the group selection area 408 to display groups focused on a user selection of a selectable element of the plurality of focus item selectable elements 414. Characteristics that may be selected by the user include, but are not limited to, posts 415, users 416, hashtags (graph elements comprising hashtags) 417, media (graph elements comprising media) 418, links (graph elements comprising a link) 419, and ticker symbols/cashtags (graph elements comprising a ticker symbol or cashtag) 420. Selection of one of the selectable elements may cause the group selection area 408 to display information related to the focus item associated with the selected selectable element, with FIG. 7 displaying cashtag groups, FIG. 8 displaying hashtag groups, FIG. 9 displaying link groups, FIG. 10 displaying media groups, and FIG. 11 displaying user groups.

Figure 13:
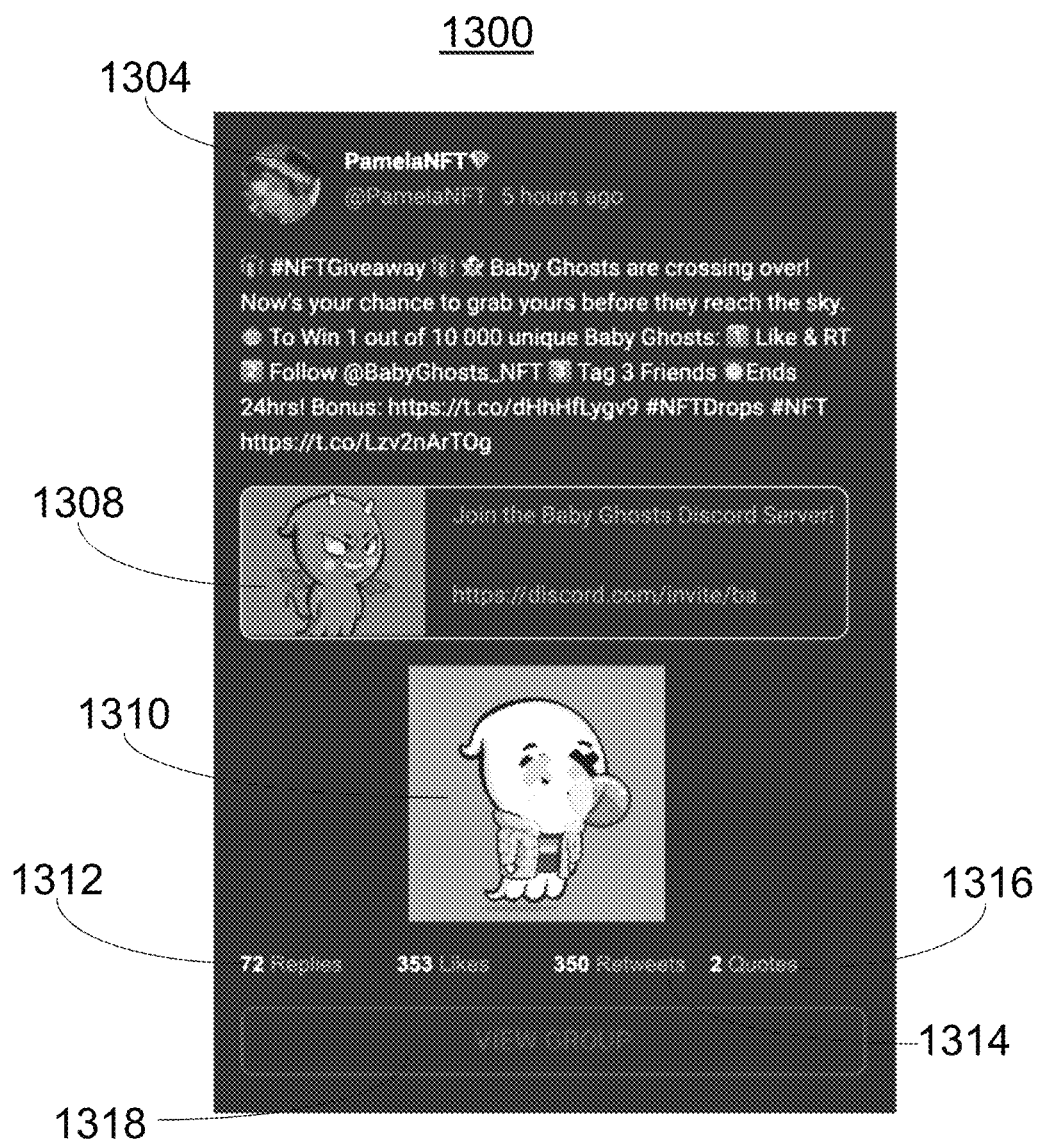
FIG. 13 is a graphical representation of a data window showing node information of a node from a map according to FIGS. 4-12.

The method 300 may continue at 314 with receiving a node selection from the user. The node selection may be understood as receiving an input from a user input device as described above to indicate the selection of a particular node displayed on the user interface 400. The method 300 continues at 316 with displaying the node information for the selected node at 316 and displaying engagement functions at 318. Referring now additionally to FIG. 13, additional aspects of the user interface 400 are presented. Specifically, the node information that may be displayed upon the selection of a node as described above is presented as a data window 1300. The data window 1300 may comprise plurality of engagement function selectable elements, constituting display of the engagement functions 318. Each of the plurality of engagement function selectable elements may be associated with a manner by which the user of the user interface 400 may engage with the selected node. The plurality of engagement function selectable elements may include a selectable element for a variety of such engagement methods, including, but not limited to, a node user element 1304, a post time element 1306, a post link element 1308, a media element 1310, replies element 1312, a reposts element 1314, and a quotes element 1316. Each of the engagement function selectable elements may be operable such that selection of the elements results in the user being presented with information related to the engagement function associated with the selectable element. Specifically, when a user selects the node user element 1304, one of a pop-up window within the user interface 400 displaying the node user's account and a new page in a web browser displaying the node user's page on the social media platform from which the post underlying the node was received may be presented. When a user selects the post time element 1306, one of a pop-up window within the user interface 400 displaying the post underlying the node and a new page in a web browser displaying the post underlying the node on the social media platform may be presented. When a user selects the post link element 1308, one of a pop-up window within the user interface 400 displaying the Internet resource, in most instances a web page, and a new page in a web browser displaying the content of the link may be presented. When a user selects the media element 1310, one of a pop-up window within the user interface 400 displaying or playing the media content and a new page in a web browser displaying the media content is presented. When a user selects the replies element, a pop-up window displaying the recent reply posts to the post underlying the node on the social media platform is presented in the user interface. The selection of any of these elements constitutes the final step in method 300, receiving an engagement selection from the user. The data window 1300 further comprises a View Group selectable element 1318 that may highlight the conversation related to the group of the data window in the map area 306 of the user interface 400 as described above.

Figure 14:
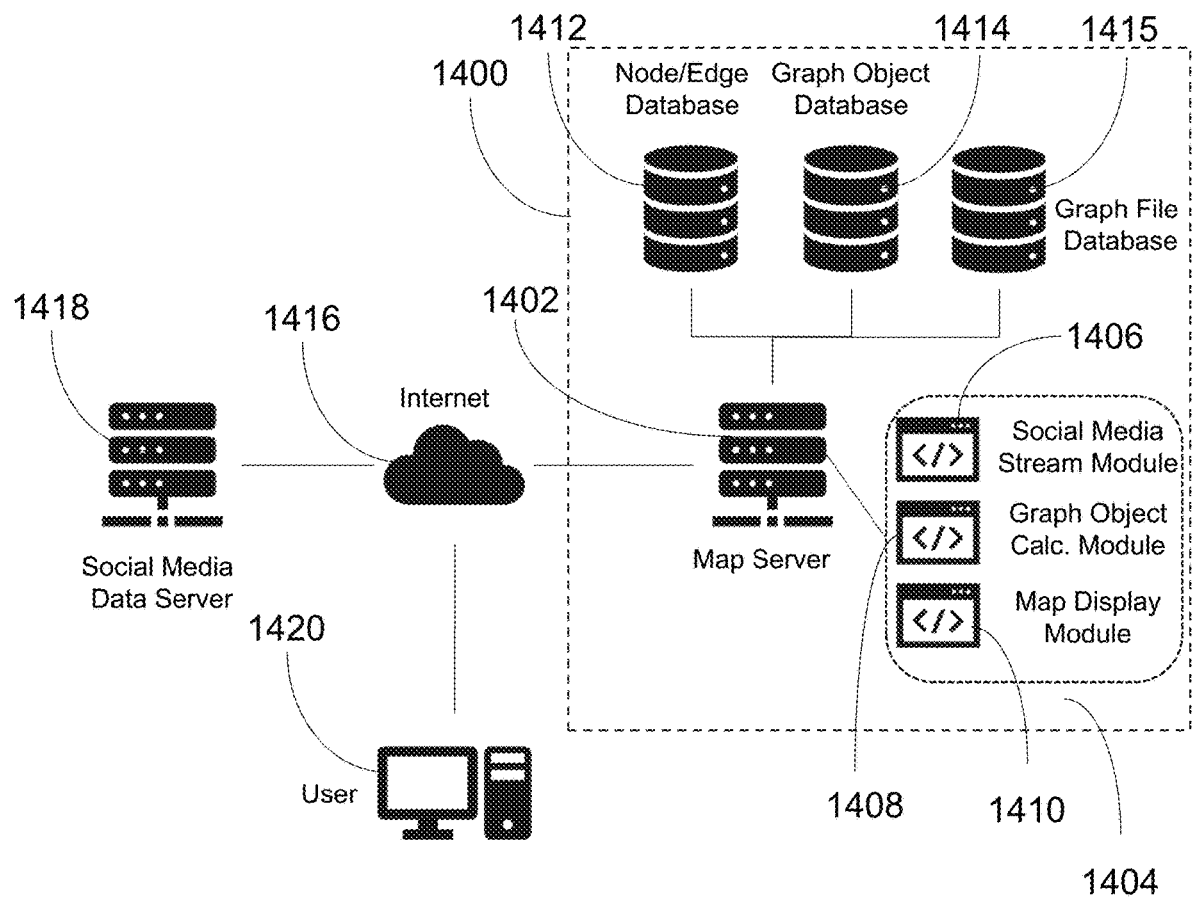
FIG. 14 is a schematic representation of a server operable to perform the inventive method according to an embodiment of the invention.

Referring now to FIG. 14, a schematic view of a system 1400 operable to generate and display a map as described above is presented. The system 1400 may comprise a server, referred to as a map server 1402, comprising hardware operable to execute software to perform the above-described functions. The hardware may include a processor, which may be any type of digital processing device as is known in the art, including, but not limited to, integrated circuits, microprocessors, field programmable gate arrays, and the like. The map server 1402 hardware may further comprise at least one non-transitory computer-readable storage medium operable to store software and other digital data thereon, such hardware including, but not limited to, hard disk drives, solid state drives, flash drives, ROM, PROM, EPROM, EEPROM, optical disks, magnetic tape, and the like. The map server 1402 hardware may further comprise a network communication device operable to enable the map server 1402 to communicate across a network, such as a personal area network, a local area network, or a wide area network, such as the Internet. The network communication device may be any hardware operable to enable such communication, including, but not limited to, an Ethernet adapter, a Wi-Fi adapter or any other adapter conforming to IEEE 802.xx standards, a cellular communication device, and any other wired or wireless digital communication device as is known in the art.

The system 1400 may further comprise a plurality of modules 1404 stored on the non-transitory computer-readable medium of the server. The modules 1404 may be software packages operable to perform the methods 100, 200, 300 described hereinabove. Specifically, the system 1400 may comprise a social media stream module 1406 operable to perform method 100, a graph object calculation module 1408 operable to perform method 200, and a map display module 1410 operable to perform method 300.

The system 1400 may further comprise one or more databases on which data may be stored as described in the above methods 100, 200, 300. The databases may be maintained on non-transitory computer-readable media as described above. The system may comprise a node/edge database 1412 corresponding to the node/edge database 140 of FIG. 1, a graph object database 1414 upon which graph objects are written, as depicted at 142 of FIG. 1, and a graph file database 1415 upon which graph files comprising a plurality of graph objects are written, as depicted at 146 of FIG. 1.

The map server 1402 may be operable to communicate across the Internet 1416 via the network communication device. Specifically, the map server 1402 may communicate with a social media data server 1418 via the Internet 1416 to receive the social media stream 102 shown in FIG. 1. Moreover, the map server 1402 may communicate with a user device 1420 for the display of the user interface 400 and receipt of user inputs via the Internet 1416.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of generating a dynamic hotspot map from social media information and interacting with the same comprising:
   performing a streaming social media data collection function comprising:
      receiving a stream of social media data from a social media data stream source;
      identifying a plurality of social media objects from the stream of social media data, the plurality of social media objects comprising a plurality of nodes and edges;
      writing the plurality of nodes and edges to a node and edge database;
      writing a plurality of graph objects for each node or edge written to the node and edge database; and
      writing a graph file comprising the plurality of graph object to a graph file database;
   performing a grapher function comprising:
      opening the graph file from the graph file database;
      applying one or more network functions to the graph file, producing one or more characteristic indicators for each graph object comprised by the graph file;
      combining the characteristic indicators of each graph object with the graph objects that comprise all data associated with a node, defining a plurality of hydrated nodes;
      calculating an exposure value of each hydrated node of the plurality of hydrated nodes;
      calculating a velocity value of each hydrated node of the plurality of hydrated nodes;
      calculating a momentum value of each hydrated node of the plurality of hydrated nodes;
      writing each of the exposure value, velocity value, and momentum value, collectively defined as time series data, for each hydrated node of the plurality of hydrated nodes to the graph object database, the graph object and time series data associated therewith for all hydrated nodes of the plurality of hydrated nodes being defined as the graph object data;
      exporting the graph object data comprised by the graph object database to a front-end mapping and interaction module;
   performing a mapping and interaction method comprising:
      receiving a map selection from a user device, the map selection comprising an instruction to display the graph object data received at the front-end mapping and interacting module;
      receiving an activity mode selection from the user device;
      receiving one or more filter selections from the user device; and
      sending display information to the user device for displaying as a map the graph object data received at the front-end mapping and interacting module responsive to the map selection, the activity mode selection, and the one or more filter selections, defining a plurality of displayed graph objects, the plurality of displayed graph objects comprising a plurality of displayed nodes.

2. The method of claim 1 wherein the activity mode selection is an activity mode configured to facilitate at least one of:
   a target mode defined as identifying larger groups having high consensus around a single topic;
   a shape mode defined as identifying engaged social media users and relevant conversations outside an immediate network of a user associated with the user device; and
   an amplify mode defined as identifying real-time social trends having characteristics suggesting virality.

3. The method of claim 2 wherein the target mode is defined by weighting the plurality of graph objects by the formula:

$$T = (0.5*q + 0.3*k_{reply} + 0.15*k_{repost} + 0.05*k_{normalized\ favorite})*\text{exposure}$$

where T is the target score for the graph object, $k_{reply}$ is a quantity of replies to a social media object underlying the graph object, $k_{repost}$ is a quantity of reposts to the social media object underlying the graph object, $k_{normalized\ favorite}$ is a quantity of positive reactions to the social media object underlying the graph object, said quantity having been normalized by rescaling the number of positive reactions to a common scale, and exposure is a quantity of users on a social media platform that subscribe to or follow the user that created the social media object underlying the graph object.

4. The method of claim 3 wherein the shape mode is defined by:
   identifying identified groups in the target mode that have the greatest number of source edges; and
   placing the identified groups proximate to the center of the map comprising the graph object data.

5. The method of claim 2 wherein the amplify mode is defined by:
   calculating a betweenness centrality velocity for each node associated with a user by determining a change in the betweenness centrality value that node;
   identifying amplifying nodes associated with a user having a comparatively greater betweenness centrality velocity compared to the other nodes associated with a user; and
   configuring the display information sent to the user device for displaying as a map the graph object data to identify the amplifying nodes on the map displayed on the user device.

6. The method of claim 1 wherein the mapping and interaction method further comprises:
   receiving a node selection of the plurality of displayed nodes from the user device;
   sending display information to the user device for displaying information related to the node selection;
   sending display information to the user device for displaying engagement functions; and
   receiving an engagement selection from the user device.

7. The method of claim 1 wherein the streaming social media data function further comprises:
   writing a count of the nodes and edges associated with each status object into an event dataframe; and
   trimming at least one node or edge from the node and edge database by performing the steps of:
      identifying an oldest status object and associated graph object in the event dataframe;
      deleting the associated one or more associated grid objects from the node and edge database; and
      removing the count of the status object from the event dataframe.

8. A system for generating a dynamic hotspot map from social media information and interacting with the same comprising:

at least one non-transitory storage medium;
a node and edge database stored on the non-transitory storage medium comprising a plurality of nodes, edges, and graph objects written thereto, the nodes, edges, and a plurality of graph objects being generated by a streaming social media data collection function, the streaming social media data collection function comprising:
  receiving a stream of social media data from a social media data stream source;
  identifying a plurality of social media objects from the stream of social media data, the plurality of social media objects comprising a plurality of nodes and edges;
  writing the plurality of nodes and edges to the node and edge database;
  writing a plurality of graph object for each node or edge written to the node and edge database; and
  writing a graph file comprising the plurality of graph object to a graph file database;
the graph file database stored on the non-transitory storage medium, comprising a graph file that comprises the plurality of graph objects comprised by the node and edge database;
a graph object database stored on the non-transitory storage medium comprising graph object data written thereto, the graph object data being generated by a grapher function, the grapher function comprising:
  opening the graph file from the graph file database;
  applying one or more network functions to the graph file, producing one or more characteristic indicators for each graph object comprised by the graph file;
  combining the characteristic indicators of each graph object with the graph objects that comprise all data associated with a node, defining a plurality of hydrated nodes;
  calculating an exposure value of each graph object comprised by the graph file;
  calculating a velocity value of each graph object comprised by the graph file;
  calculating a momentum value of each graph object comprised by the graph file;
  writing each of the exposure value, velocity value, and momentum value, collectively defined as time series data, for each graph object comprised by the graph file to the graph object database, the graph object and time series data associated therewith for all graph objects being defined as the graph object data; and
  exporting the graph object data comprised by the graph object database to a front-end mapping and interaction module; and
a map server comprising:
  a social media stream module operable to perform the streaming social media data collection function;
  a graph object calculation module operable to perform the grapher function; and
  a map display module configured to perform a mapping and interaction method operable to:
    receive a map selection from a user device, the map selection comprising an instruction to display the graph object data received at the front-end mapping and interacting module;
    receive an activity mode selection from the user device, the activity mode selection being an activity mode configured to facilitate at least one of:
      identifying larger groups having high consensus around a single topic, defining a target mode;
      identifying engaged social media users and relevant conversations outside an immediate network of a user associated with the user device, defining a shape mode; and
      identifying real-time social trends having characteristics suggesting virality, defining an amplify mode;
    receive one or more filter selections from the user device; and
    send display information to the user device for displaying as a map the graph object data received at the front-end mapping and interacting module responsive to the map selection, the activity mode selection, and the one or more filter selections, defining a plurality of displayed graph objects, the plurality of displayed graph objects comprising a plurality of displayed nodes;
  a processor positioned in communication with the non-transitory storage medium on which the node and edge database, the graph file database, and the graph object database and operable to execute each of the social media stream module, the graph object calculation module, and the map display module; and
  a network communication device positioned in communication with the processor and operable to communicate across a computer network.

9. The system of claim 8 wherein the activity mode selection is an activity mode configured to facilitate at least one of:
  a target mode defined by identifying larger groups having high consensus around a single topic;
  a shape mode defined by identifying engaged social media users and relevant conversations outside an immediate network of a user associated with the user device; or
  an amplify mode defined by identifying real-time social trends having characteristics suggesting virality.

10. The system of claim 9 wherein the target mode is defined by weighting the plurality of graph objects by the formula:

$$T=(0.5*q+0.3*k_{reply}+0.15*k_{repost}+0.05*k_{normalized\ favorite})*\text{exposure}$$

where T is the target score for the graph object, $k_{reply}$ is a quantity of replies to a social media object underlying the graph object, $k_{repost}$ is a quantity of reposts to the social media object underlying the graph object, $k_{normalized\ favorite}$ is a quantity of positive reactions to the social media object underlying the graph object, said quantity having been normalized by rescaling the number of positive reactions to a common scale, and exposure is a quantity of users on a social media platform that subscribe to or follow the user that created the social media object underlying the graph object.

11. The system of claim 10 wherein the shape mode is defined by:
  identifying identified groups in the target mode that have the greatest number of source edges; and
  placing the identified groups proximate to the center of the map comprising the graph object data.

12. The system of claim 9 wherein the amplify mode is defined by:
  calculating a betweenness centrality velocity for each node associated with a user by determining a change in the betweenness centrality value that node;

identifying amplifying nodes associated with a user having a comparatively greater betweenness centrality velocity compared to the other nodes associated with a user; and configuring the display information sent to the user device for displaying as a map the graph object data to identify the amplifying nodes on the map displayed on the user device.

13. The system of claim 8 wherein the mapping and interaction method further comprises:

receiving a node selection of the plurality of displayed nodes from the user device;

sending display information to the user device for displaying information related to the node selection;

sending display information to the user device for displaying engagement functions; and receiving an engagement selection from the user device.

14. The system of claim 8 wherein the streaming social media data function further comprises:

writing a count of the nodes and edges associated with each status object into an event dataframe; and trimming at least one node or edge from the node and edge database by performing the steps of:

identifying an oldest status object and associated graph object in the event dataframe;

deleting the associated one or more associated grid objects from the node and edge database; and removing the count of the status object from the event dataframe.

15. A method of generating a dynamic hotspot map from social media information and interacting with the same comprising:

performing a streaming social media data collection function comprising:

receiving a stream of social media data from a social media data stream source;

identifying a plurality of social media objects from the stream of social media data, the plurality of social media objects comprising a plurality of nodes and edges;

writing the plurality of nodes and edges to a node and edge database;

writing a plurality graph object for each node or edge written to the node and edge database; and writing a graph file comprising the plurality of graph object to a graph file database;

performing a grapher function comprising:

opening the graph file from the graph file database;

applying one or more network functions to the graph file, producing one or more characteristic indicators for each graph object comprised by the graph file;

combining the characteristic indicators of each graph object with the graph objects that comprise all data associated with a node, defining a plurality of hydrated nodes;

calculating an exposure value of each hydrated node of the plurality of hydrated nodes;

calculating a velocity value of each hydrated node of the plurality of hydrated nodes;

calculating a momentum value of each hydrated node of the plurality of hydrated nodes;

writing each of the exposure value, velocity value, and momentum value, collectively defined as time series data, for each hydrated node of the plurality of hydrated nodes to the graph object database the graph object and time series data associated therewith for all hydrated nodes of the plurality of hydrated nodes being defined as the graph object data, exporting the graph object data comprised by the graph object database to a front-end mapping and interaction module;

performing a mapping and interaction method comprising:

receiving a map selection from a user device, the map selection comprising an instruction to display the graph object data received at the front-end mapping and interacting module;

receiving an activity mode selection from the user device, the activity mode selection is an activity mode configured to facilitate at least one of:

a target mode defined as identifying larger groups having high consensus around a single topic;

a shape mode defined as identifying engaged social media users and relevant conversations outside an immediate network of a user associated with the user device; and an amplify mode defined as identifying real-time social trends having characteristics suggesting virality;

receiving one or more filter selections from the user device; and sending display information to the user device for displaying as a map the graph object data received at the front-end mapping and interacting module responsive to the map selection, the activity mode selection, and the one or more filter selections, defining a plurality of displayed graph objects, the plurality of displayed graph objects comprising a plurality of displayed nodes;

receiving a node selection of the plurality of displayed nodes from the user device;

sending display information to the user device for displaying information related to the node selection;

sending display information to the user device for displaying engagement functions; and receiving an engagement selection from the user device.

16. The method of claim 15 wherein the target mode is defined by weighting the plurality of graph objects by the formula:

$$T = (0.5*q + 0.3*k_{reply} + 0.15*k_{repost} + 0.05*k_{normalized\ favorite})*exposure$$

where T is the target score for the graph object, $k_{reply}$ is a quantity of replies to a social media object underlying the graph object, $k_{repost}$ is a quantity of reposts to the social media object underlying the graph object, $k_{normalized\ favorite}$ is a quantity of positive reactions to the social media object underlying the graph object, said quantity having been normalized by rescaling the number of positive reactions to a common scale, and exposure is a quantity of users on a social media platform that subscribe to or follow the user that created the social media object underlying the graph object.

17. The method of claim 15 wherein the shape mode is defined by:

identifying identified groups in the target mode that have the greatest number of source edges; and placing the identified groups proximate to the center of the map comprising the graph object data.

18. The method of claim 15 wherein the amplify mode is defined by:

calculating a betweenness centrality velocity for each node associated with a user by determining a change in the betweenness centrality value that node;

identifying amplifying nodes associated with a user having a comparatively greater betweenness centrality velocity compared to the other nodes associated with a user; and configuring the display information sent to the user device for displaying as a map the graph object data to identify the amplifying nodes on the map displayed on the user device.

19. The method of claim 15 wherein the streaming social media data function further comprises:

writing a count of the nodes and edges associated with each status object into an event dataframe; and trimming at least one node or edge from the node and edge database by performing the steps of:
identifying an oldest status object and associated graph object in the event dataframe;
deleting the associated one or more associated grid objects from the node and edge database; and
removing the count of the status object from the event dataframe.

* * * * *